United States Patent [19]
Pissiotas et al.

[11] 3,925,517
[45] Dec. 9, 1975

[54] PHOSPHORYLFORMAMIDINES

[75] Inventors: Georg Pissiotas, Lorrach, Germany; Willy Meyer, Basel, Switzerland; Beat Bohner, Binningen, Switzerland; Jozef Drabek, Allschwil, Switzerland

[73] Assignee: Ciba-Geigy Corporation, Ardsley, N.Y.

[22] Filed: Oct. 23, 1974

[21] Appl. No.: 517,358

[30] Foreign Application Priority Data
Nov. 5, 1973  Switzerland.................. 15561/73
July 29, 1974  Switzerland.................. 10397/74

[52] U.S. Cl................. 260/944; 260/984; 424/211
[51] Int. Cl.²...................... A01N 9/36; C07F 9/24
[58] Field of Search........................... 260/944, 984

[56] References Cited
UNITED STATES PATENTS
3,734,980  5/1973  Pallos................................ 260/944
3,825,635  7/1974  Hofer et al...................... 260/984 X Primary Examiner—Richard L. Raymond
Attorney, Agent, or Firm—Harry Falber; Frederick H. Rabin

[57] ABSTRACT

New phosphoryl formamidines their manufacture and use as active ingredients in pesticides especially insecticides and acaricides are disclosed. The compounds correspond to the formula

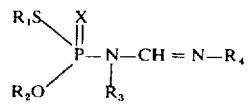

wherein $R_1$, $R_3$ and $R_4$ each represent $C_1$-$C_5$-alkyl, $R_2$ represents methyl or ethyl, and X represents oxygen or sulphur.

9 Claims, No Drawings

PHOSPHORYLFORMAMIDINES

The present invention relates to phosphorylformamidines, to processes for their preparation, and to their use in pest control.

The said phosphorylformamidines have the formula

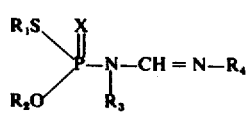

(I)

wherein
$R_1$, $R_3$ and $R_4$ each represent $C_1$–$C_5$-alkyl,
$R_2$ represents methyl or ethyl, and
X represents oxygen or sulphur.

The alkyl groups denoted by $R_1$, $R_3$ and $R_4$ can be straight-chain or branched-chain. These groups are: methyl, ethyl, propyl, isopropyl, n-, i-, sec.-, tert.-butyl, n-pentyl, and isomers thereof.

Preferred compounds of formula I are those wherein
$R_1$ represents $C_1$–$C_3$-alkyl,
$R_2$ represents methyl or ethyl,
$R_3$ and $R_4$ each represent $C_1$–$C_3$-alkyl, and
X represents oxygen.

The compounds of formula I in which X is oxygen or sulphur can be prepared by methods known per se, for example:

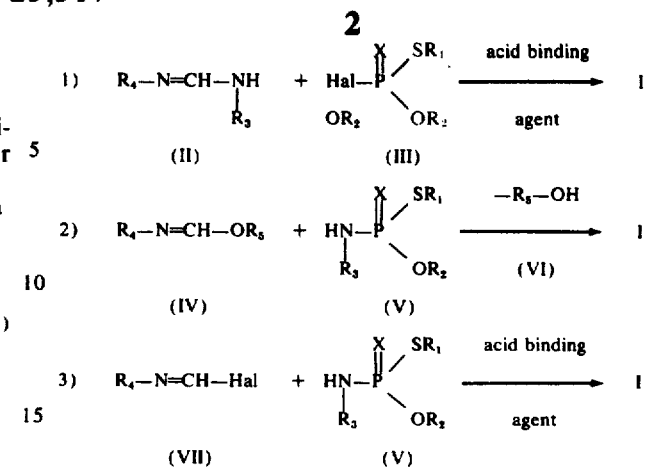

By the following processes there can be prepared only such compounds of formula I wherein X represents oxygen:

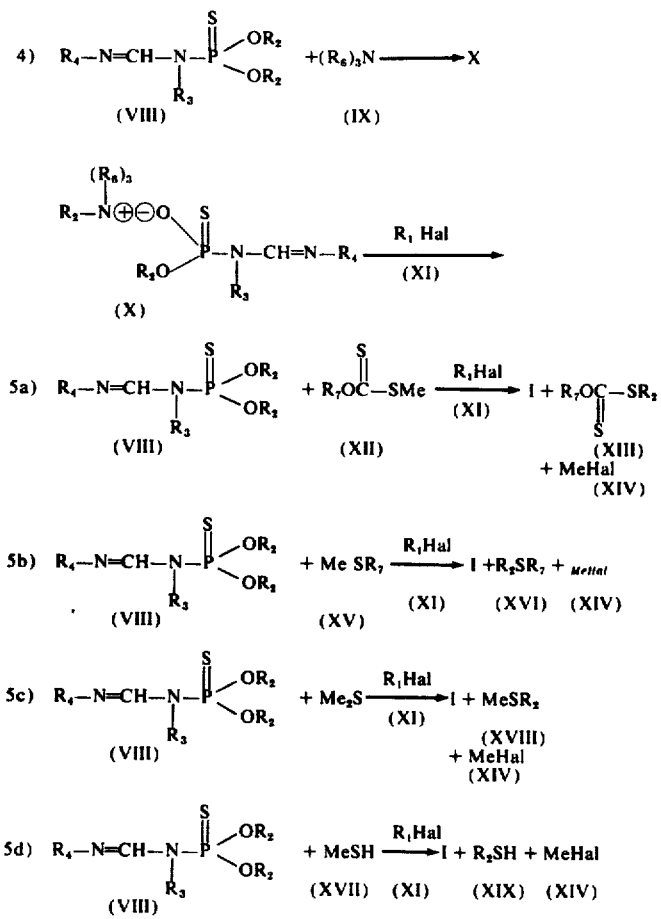

In formulae II to XIX, the symbols $R_1$ to $R_4$ and X have the meanings given for formula I, and $R_5$ to $R_7$ each stand for alkyl, particularly for $C_1$–$C_4$-alkyl, Me stands for a metal, especially an alkali metal, ammonium or alkylammonium, and Hal represents fluorine, chlorine, bromine or iodiine, particularly chlorine. Depending on the reaction condition, it may be advantageous in order to enhance the yield or reduce the duration of the reaction to add a catalyst such as, copper, copper chloride or potassium iodide. Suitable acid-binding agents are: tertiary amines, e.g. trialkylamines, pyridine or dialkylanilines; inorganic bases such as hydrides or hydroxides; carbonates and bicarbonates of alkali metals and alkaline-earth metals.

The processes 1 to 5 are performed at a reaction temperature of between 0° and 130°C, at normal pressure and in solvents or diluents.

Suitable solvents or diluents are, for example, ethers and ethereal compounds, such as diethyl ether, dipropyl ether, dioxane or teterhydrofuran; amides such as N,N-dialkylated carboxylic acid amides; aliphatic, aromatic as well as halogenated hydrocarbons, especially benzene, toluene, xylenes, chloroform or chlorobenzene; nitriles such as acetonitrile; ketones such as acetone or methyl ethyl ketone; alcohols such as ethanol; dimethylsulphate, and water.

Starting materials of formulae II, III, IV, V, VII, VIII, IX, XI, XII, XV and XVII are known, or can be prepared by methods analogous to known methods.

The active substances of formula I are suitable for the control of various animal and plant pests.

They thus possess nematocidal properties, and can be used, for example, for the control of phytopathogenic nematodes. In some cases, the active substances of formula I are suitable also as herbicides and as agents regulating plant growth, as well as for the control of members of the division Thallophyta, such as for the control of viruses, bacteria and phytopathogenic fungi. They are effective in particular, however, against all development stages, such as eggs, larvae, nymphs, pupae and adults, of insects and members of the order acarina, such as mites and ticks.

The compounds of formula I have a lethal or repellant action against, for example, the following insects or members of the order acarina:- insects of the families: Tettigonidae, Gryllidae, Gryllotalpidae, Blattidae, Reduviidae, Phyrrhocoridae, Cimicidae, Delphacidae, Aphididae, Diaspididae, Pseudococidae, Scarabaeidae, Dermestidae, Coccinellidae, Tenebrionidae, Chrysomelidae, Bruchidae, Tineidae, Noctuidae, Lymatriidae, Pyralidae, Gulicidae, Tipulidae, Stomoxydae, Trypetidae, Muscidae, Calliphoridae and Pulicidae, as well as acarids of the families: Ixodidae, Argasidae, Tetranychidae and Dermanyssidae.

The insecticidal and/or acaricidal action can be appreciably broadened and adapted to suit given conditions by the addition of other insecticides and/or acaricides. Suitable additives are, for example:
organic phosphorus compounds,
nitrophenols and derivatives thereof,
formamidines,
ureas, pyrethrin-like derivatives,
carbamates and chlorinated hydrocarbons.

The compounds of formula I can be used on their own or together with suitable carriers and/or additives. Suitable carriers and additives may be solid or liquid, and they correspond to the substances common in formulation practice, such as, e.g. natural or regenerated substances, solvents, dispersing agents, wetting agents, adhesives, thickeners, binders and/or fertilisers.

For application, the compounds of formula I can be processed into the form of dusts, emulsion concentrates, granulates, dispersions, sprays or solutions, the formulation of these preparations being effected in a manner commonly known in practice. Also to be mentioned are cattle dips and spray races, in which aqueous preparations are used.

The agents according to the invention are prepared in a manner known per se by the intimate mixing and-/or grinding of active substances of formula I with suitable carriers, optionally with the addition of dispersing agents or solvents which are inert to the active substances. The active substances can be obtained and used in the following forms:
solid preparations:- dusts, scattering agents, granulates, coated granulates, impregnated granulates and homogeneous granulates;
liquid preparations:-
 a. water-dispersible active-substance concentrates: wettable powders, pastes or emulsions;
 b. solutions.

The content of active substance in the described agents is between 0.1 and 95%.

The active substances of formula I can be formulated, for example, as follows:

Dusts:

The following substances are used in the preparation of (a) a 5% dust, and (b) a 2% dust:
a.
 5 parts of active substance,
 95 parts of talcum;
b.
 2 parts of active substance,
 1 part of highly dispersed silicic acid,
 97 parts of talcum.

The active substances are mixed and ground with the carriers.

Granulate:

The following substances are used to prepare a 5% granulate:
 5 parts of active substance,
 0.25 part of epichlorohydrin,
 0.25 part of cetyl polyglycol ether,
 3.50 parts of polyethylene glycol,
 91 parts of kaolin (particle size 0.3 – 0.8 mm).

The active substance is mixed with epichlorohydrin and dissolved with 6 parts of acetone; the polyethylene glycol and cetyl polyglycol ether are then added. The solution thus obtained is sprayed onto kaolin, and the acetone is subsequently evaporated off in vacuo.

Wettable powder:

The following constituents are used for the preparation of (a) a 40%, (b) and (c) a 25%, and (d) a 10% wettable powder:
a.
 40 parts of active substance,
 5 parts of sodium lignin sulphonate,
 1 part of sodium dibutyl-naphthalene sulphonate,
 54 parts of silicic acid;
b.
 25 parts of active substance,
 4.5 parts of calcium lignin sulphonate,
 1.9 parts of Champagne chalk/hydroxyethyl cellulose mixture (1:1),
 1.5 parts of sodium dibutyl naphthalene sulphonate,
 19.5 parts of silicic acid,
 19.5 parts of Champagne chalk,
 28.1 parts of kaolin;
c.
 25 parts of active substance,
 2.5 parts of isooctylphenoxy-polyoxyethylene-ethanol,
 1.7 parts of Champagne chalk/hydroxyethyl cellulose mixture (1:1),
 8.3 parts of sodium aluminium silicate,
 16.5 parts of kieselguhr, 46 parts of kaolin;

d.
10 parts of active substance,
3 parts of a mixture of the sodium salts of saturated fatty alcohol sulphates,
5 parts of naphthalenesulphonic acid/formaldehyde condensate,
82 parts of kaolin.

The active substances are intimately mixed, in suitable mixers, with the additives, the mixture being then ground in the appropriate mills and rollers. Wettable powders are obtained which can be diluted with water to give suspensions of any desired concentration.

Emulsifiable concentrates:

The following substances are used to prepare (a) a 10% and (b) a 25% emulsifiable concentrate:

a.
10 parts of active substance,
3.4 parts of epoxidised vegetable oil,
3.4 parts of a combination emulsifier consisting of fatty alcohol polyglycol ether and alkylarylsulphonate calcium salt,
40 parts of dimethylformamide,
43.2 parts of xylene;

b.
25 parts of active substance,
2.5 parts of epoxidised vegetable oil,
10 parts of an alkylarylsulphonate/fatty alcohol polyglycol ether mixture,
5 parts of dimethylformamide,
57.5 parts of xylene.

From these concentrates it is possible to prepare, by dilution with water, emulsions of any desired concentration.

Spray:

The following constituents are used to prepare a 5% and 95% spray, respectively:
5 parts of active substance,
1 part of epichlorhydrin,
94 parts of ligroin (boiling limits 160°–190°C); and
95 parts of active substance,
5 parts of epichlorohydrin.

EXAMPLE 1

Preparation of

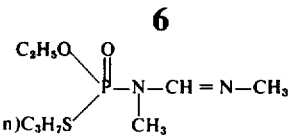

40.5 g (0.2 mole) of O-ethyl-S-n-propyl-thiochlorophosphate is added dropwise at 0.5° to 10°C, within 30 minutes, to a solution of 28.8 g (0.4 mole) of N,N'-dimethylformamidine in 300 ml of toluene. The white suspension is stirred at 20°C for a further 15 hours, and then 100 ml of water is added. The organic phase is washed twice with 50 ml of water each time, and once with 100 ml of NaCl-solution; it is dried with $Na_2SO_4$, and the toluene is removed in vacuo to obtain 46.1 g of the liquid crude product.

Distillation in high vacuum yields 35.1 g of pure active substance, B.P. 79°–81°C/0.01 mm Hg, as colourless liquid.

The following compounds are prepared in an analogous manner:

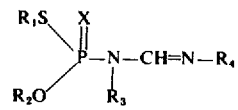

| $R_1$ | $R_2$ | $R_3$ | $R_4$ | X | Physical data |
|---|---|---|---|---|---|
| $-CH_3$ | $-C_2H_5$ | $-CH_3$ | $-CH_3$ | O | B.P. :65–69°C/0.02 Torr |
| $-C_3H_{7(n)}$ | $-C_2H_5$ | $-C_2H_5$ | $-C_2H_5$ | O | B.P. :89°C/0.06 Torr |
| $-C_3H_{7(n)}$ | $-C_2H_5$ | $-C_3H_{7(n)}$ | $-C_3H_{7(n)}$ | O | B.P. :54°C/0.004 Torr |
| $-C_3H_{7(n)}$ | $-C_2H_5$ | $-C_3H_{7(n)}$ | $-C_3H_{7(n)}$ | S | $n_D^{20} = 1.5149$ |
| $-C_3H_{7(n)}$ | $-C_2H_5$ | $-C_2H_5$ | $-C_2H_5$ | S | $n_D^{20} = 1.5197$ |
| $-C_3H_{7(n)}$ | $-C_2H_5$ | $-CH_3$ | $-CH_3$ | S | $n_D^{20} = 1.5332$ |
| $-CH_3$ | $-CH_3$ | $-CH_3$ | $-CH_3$ | O | |
| $-CH_3$ | $-CH_3$ | $-C_2H_5$ | $-C_2H_5$ | O | |
| $-C_3H_{7(n)}$ | $-C_2H_5$ | $-C_4H_{9(n)}$ | $-C_4H_{9(n)}$ | O | |
| $-C_3H_{7(n)}$ | $-C_2H_5$ | $-C_4H_{9(i)}$ | $-C_4H_{9(i)}$ | O | |
| $-C_5H_{11(n)}$ | $-C_2H_5$ | $-CH_3$ | $-CH_3$ | O | |
| $-C_4H_{9(i)}$ | $-C_2H_5$ | $-CH_3$ | $-CH_3$ | O | |

EXAMPLE 2

A. Insecticidal stomach poison action

Cotton and potato plants were sprayed with a 0.05% aqueous active-substance emulsion (obtained from a 10% emulsifiable concentrate).

After the drying of the resulting coating, *Spodoptera littoralis* or *Heliothis virescens* larvae $L_3$ were placed onto the cotton plants, and Colorada beetle larvae (*Leptinotarsa decemlineata*) onto the potato plants. The test was carried out at 24°C with 60% relative humidity.

Compounds according to Example 1 exhibited in the above test a good insecticidal stomach poison action against *Spodoptera littoralis*, *Heliothis virescens* and *Leptinotarsa decemlineata* larvae.

B. Systemic insecticidal action

In order to determine the systemic action, rooted bean plants (*Vicia faba*) were placed into a 0.01% aqueous active-substance solution (obtained from a 10% emulsifiable concentrate). After a period of 24 hours, bean aphids (Aphis fabae) were placed onto the parts of the plant above the soil. The insects were protected by a special device from the effects of contact and of gas. The test was carried out at 24°C with 70% relative humidity.

In the above test, compounds according to Example 1 exhibited a systemic action against *Aphis fabae*.

EXAMPLE 3

Action against ticks

A. *Rhipicephalus bursa*

In each case, 5 adult ticks or 50 tick larvae were placed into a small glass test tube, and subsequently immersed for 1 to 2 minutes in 2 ml of an aqueous emulsion from a dilution series of 100, 10, 1 and 0.1 ppm of test substance. The tubes were then sealed with a standardised cotton plug, and inverted so that the active-substance emulsion could be absorbed by the cotton wool.

An evaluation in the case of the adults was made after 2 weeks, and in the case of the larvae after 2 days. There were two repeats for each test.

B. *Boophilus microplus* (larvae)

With a dilution series analogous to that in Test A, tests were carried out with 20 sensitive larvae and OP-resistant larvae, respectively (resistance is with respect to diazinon compatibility).

Compounds according to Example 1 were effective in these tests against adults and larvae of *Rhipicephalus bursa* and against sensitive and OP-resistant larvae, respectively, of *Boophilus microplus*.

EXAMPLE 4

Acaricidal action

*Phaseolus vulgaris* (plants) were infested, 12 hours before the test for acaricidal action, with an infested piece of leaf from a mass culture of *Tetranychus urticae*. The transferred mobile stages were sprayed with the emulsified test preparations from a chromatography-sprayer in a manner ensuring no running-off of the spray liquor. An assessment was made after 2 to 7 days, by examination under a binocular, of the living and of the dead larvae, adults and eggs, and the results were expressed as percentages. The treated plants were kept during the "holding time" in greenhouse compartments at 25°C.

Compounds according to Example 1 were effective in the above test against adults, larvae and eggs of *Tetranychus urticae*.

EXAMPLE 5

Action against soil nematodes

In order to test the action against soil nematodes, the active substances were added, in the concentration stated in each case, to soil infested with root-gall-nematodes (*Meloidogyne arenaria*); the whole was then intimately mixed. In the one test series, tomato seedlings were planted immediately after preparation of the soil in this manner, and in the other test series tomatoes were planted after a waiting time of 8 days.

For an assessment of the nematocidal action, the galls present on the roots were counted 28 days after planting and sowing, respectively.

Active substances according to Example 1 exhibited in this test a good action against *Meloidogyne arenaria*.

EXAMPLE 6

Action against *Piricularia oryzae* on *Oryzae sativa*

After being sprayed with a 0.05% suspension of the active substance made up as a wettable powder, young rice plants were, after drying of the applied coating, infested with a spore suspension of the fungus *Piriarlaria orycae*. After 3 days' incubation time at 24°C and with high relative humidity, an evaluation was made of the disease infestation compared with that in the case of infested but untreated control specimens. Compounds according to Example 1 were effective in this test against *Piricularia oryzae*.

EXAMPLE 7

Virucidal action against potato-virus Y (PVY) and cucumber mosaic virus (CMV)

Fifteen pepper plants (*Capsicum annuum* Var. "California Wonder") per test were cultivated in a controlled-atmosphere cupboard under well standardised conditions; and, after development of the cotyledons, transplanted to a greenhouse; they were sprayed three days later with an aqueous emulsion containing 2000 ppm of the substance to be tested and, after a further 24 hours, mechanically inoculated.

The systemic symptoms of the virus infection appeared after one week, so that it was possible to determine the antiviral activity of the tested substances.

Compounds according to Example 1 exhibited an antiviral action against potato-virus T and cucumber-mosaic virus on pepper plants.

What we claim is:

1. A phosphorylformamidine of the formula

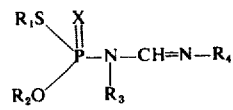

wherein
$R_1$, $R_3$ and $R_4$ represent $C_1$-$C_5$-alkyl,
$R_2$ represents methyl or ethyl, and
X represents oxygen or sulphur.

2. A compound according to claim 1 wherein
$R_1$ represents $C_1$-$C_3$-alkyl,
$R_2$ represents methyl or ethyl,
$R_3$ and $R_4$ each represent $C_1$-$C_3$-alkyl, and
X represents oxygen.

3. Compound according to claim 2 of the formula

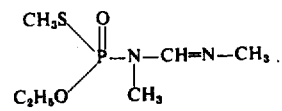

4. Compound according to claim 2 of the formula

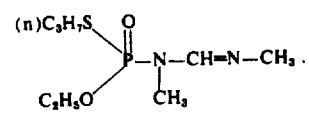

5. Compound according to claim 2 of the formula

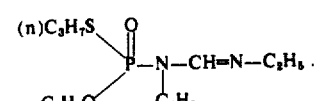

6. Compound according to claim 2 of the formula

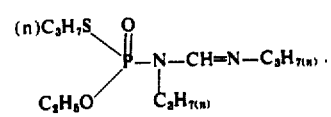

7. Compound according to claim 1 of the formula

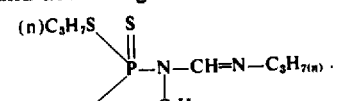

8. Compound according to claim 1 of the formula
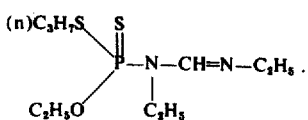
9. Compound according to claim 1 of the formula
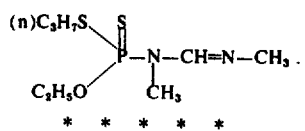
* * * * *